United States Patent [19]

Stern

[11] 4,189,744
[45] Feb. 19, 1980

[54] APPARATUS FOR GENERATING SIGNALS REPRESENTING OPERATOR-SELECTED PORTIONS OF A SCENE

[75] Inventor: Garland Stern, Brookville, N.Y.

[73] Assignee: New York Institute of Technology, Old Westbury, N.Y.

[21] Appl. No.: 752,117

[22] Filed: Dec. 20, 1976

[51] Int. Cl.² .............................................. H04N 7/18
[52] U.S. Cl. ............................................ 358/93; 358/4;
 358/75; 358/80; 358/127; 358/903; 340/706;
 340/711; 340/725; 340/747; 340/798; 340/799
[58] Field of Search .................... 358/93, 127, 4, 283,
 358/75, 76, 81, 80, 903; 340/324 A, 324 AD,
 172.5

[56] References Cited

U.S. PATENT DOCUMENTS

| | | | |
|---|---|---|---|
| 3,811,113 | 12/1972 | Saito et al. | 340/324 |
| 3,934,083 | 1/1976 | Plath | 358/78 |
| 4,017,680 | 4/1977 | Anderson | 358/903 |

Primary Examiner—Robert L. Griffin
Assistant Examiner—Edward L. Coles
Attorney, Agent, or Firm—Martin Novack

[57] ABSTRACT

The disclosure is directed to an apparatus for generating video-representative signals which represent one or more operator-selected portions of an existing scene. In accordance with the invention, frame storage means are provided for storing an array of elemental pixel values representative of the video content of the individual elemental areas of the scene. As defined herein, video content is intended to include shading and/or coloration of monochrome or color images. Means are provided for interrogating the frame storage means and for tabulating the pixel values stored in the frame storage means. Operator controllable means are provided for selecting one or more of the pixel values of the tabulation. Means responsive to the selected values are provided for forming video-representative signals corresponding to those portions of the scene having the selected pixel values. In the preferred embodiment of the invention there are provided means for displaying the tabulation of the pixel values. In this embodiment, the means for forming video-representative signals comprises means for detecting the boundaries of those portions of the scene having the selected pixel values and for storing outline-representative transition points as a function of the detected boundaries. Accordingly, an operator can select desired portions of an existing scene and automatically obtain stored contour outlines of those portions.

15 Claims, 12 Drawing Figures

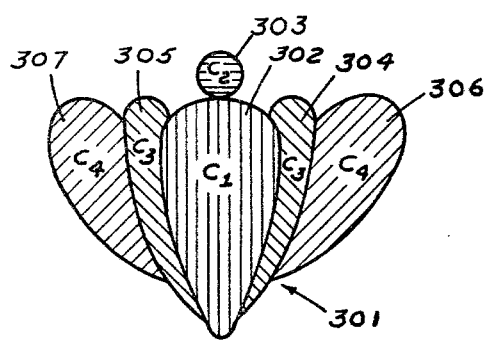
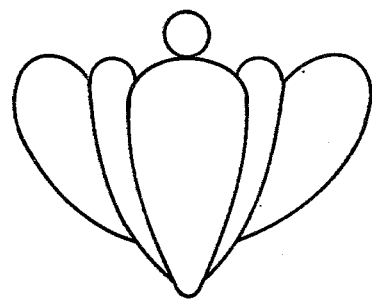
FIG.3A   FIG.3B
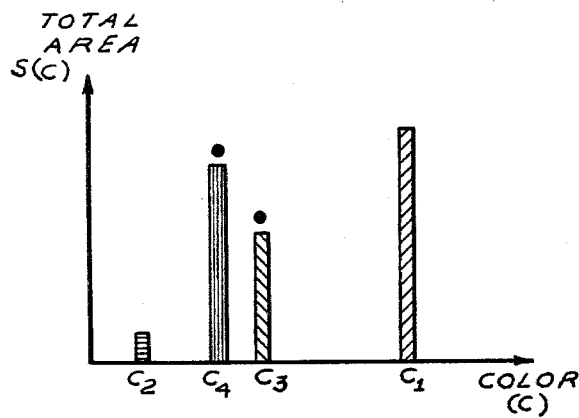
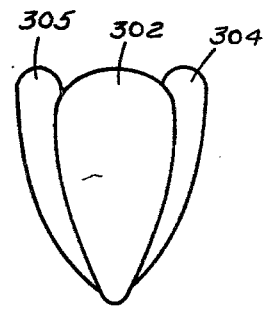
FIG.3C   FIG.3D
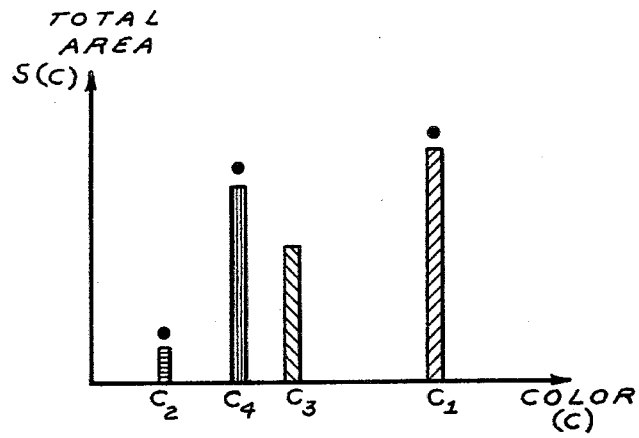
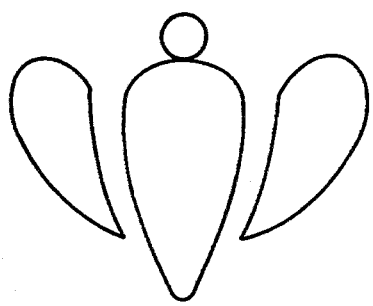
FIG.3E   FIG.3F

APPARATUS FOR GENERATING SIGNALS REPRESENTING OPERATOR-SELECTED PORTIONS OF A SCENE

BACKGROUND OF THE INVENTION

This invention relates to the field of the automatic generation of animation and, more particularly, to an apparatus for generating video-representative signals which represent one or more operator-selected portions of a scene.

Animated films are in widespread use for educational and entertainment purposes. Animated films of reasonably high quality have traditionally been very expensive to make. The initial creative work includes generation of a basic story, a sound track, and basic character designs. Typically, a schedule is generated which describes the movements and timings of each scene to be produced, and layout sketches and "key" drawings are made which define the overall design of each scene. The so-called "key" drawings or frames are still frames which show extremes of action. In the traditional animation procedure, people known as "in-betweeners" are employed to sketch frames which fill in the action between key frames. After in-betweens are sketched by hand, the hand-drawn pictures are typically transferred onto celluloid-acetate sheets and are then painted in by hand to obtain the desired image coloration. All of these tasks render the production of animated films an extremely expensive proposition. An advantage of the traditional animation process, however, is that the animator has virtually complete artistic freedom and control over the resulting film; i.e. anything that is drawn can be made to move in a desired fashion and colors can be precisely selected.

A number of approaches have been proposed for employing electronic equipment to assist in the animation process. For example, some early approaches employed electronic graphical inputs, such as data tablet inputs, to allow an animator to freehand draw sketches which were electronically displayed on a cathode ray tube. The displayed figures can be photographed to obtain basic character outlines to work from in generating the animation as described above. More advanced techniques have employed relatively large scale computer systems to assist the animator and minimize labor. For example, one approach has been to design elaborate special purpose computer systems which can perform coordinate transformations that simulate motion of drawn figures. Techniques of this type are disclosed, for example, in the U.S. Pat. Nos. 3,364,382; 3,662,374; 3,689,917; 3,700,792; 3,710,011; 3,723,803 and 3,747,087. It has also been proposed that a relatively large scale digital computer could be employed to aid the animator; e.g., by automatically generating in-between frames by interpolation of lines appearing in successive key frames. A technique of this type is described, for example, in an article entitled "Towards a Computer Animating Production Tool" by N. Burtnyk and M. Wein which appeared in the proceedings of Eurocomp Conference, Brunel—United Kingdom, May 1974. Also of possible interest are the U.S. Pat. Nos. 3,637,997; 3,665,408; 3,835,245 and 3,944,997.

The described machine aided techniques, while potentially easing an animator's labors in various ways, do not adequately provide for the animator's needs in the domain of inputting image outlines into a computer for subsequent processing. In the formulation of animated films, there are numerous instances where the animator desires to utilize the outline of particular figures in existing images, where the existing images may be previously drawn sketches, photographs, or images on video tape. For example, a number of sketches of characters in an action sequence may have already been drawn, and an animator may desire to "input" the sketches to a computer-assisted animation equipment, such as the type described in the copending U.S. Application Ser. No. 752,114, filed of even date herewith. In such instance, the character to be stored is originally in the form of a "line drawing"; viz., the memory of the machine system is loaded with the points defining the outlines of the entered characters. This may be done, for example, by tracing the outline of the sketch onto a data tablet with a data pen. The tablet, in turn, transfers the coordinate points traversed by the data pen into the computer. However, the necessity of doing this for each sketch can take considerable time. Another instance where tracing onto a data tablet is a standard technique is where an existing image, such as a color photograph or a frame of an existing film, contains one or more characters which an animator desires to use in animation being generated. There is also a long-known technique in animation known as "rotoscoping" wherein natural looking animated characters are obtained by taking films of actual "live" characters in motion and tracing the outlines of live characters from the film. There is presently a need in the art to generate outline information in these and other situations, without the laborious task of tracking, cutting, or the like.

It is an object of the present invention to provide solutions to the prior art problems as set forth.

SUMMARY OF THE INVENTION

The present invention is directed to an apparatus for generating video-representative signals which represent one or more operator-selected portions of an existing scene. In accordance with the invention, frame storage means are provided for storing an array of elemental pixel values representative of the video content of the individual elemental areas of the scene. As defined herein, video content is intended to include shading and or coloration of monochrome or color images. Means are provided for interrogating the frame storage means and for tabulating the pixel values stored in the frame storage means. Operator controllable means are provided for selecting one or more of the pixel values of the tabulation. Finally, means responsive to the selected values are provided for forming video-representative signals corresponding to those portions of the scene having the selected pixel values.

In the preferred embodiment of the invention there are provided means for displaying the tabulation of the pixel values. In this embodiment, the means for forming video-representative signals comprises means for detecting the boundaries of those portions of the scene having the selected pixel values and for storing outline-representative transition points as a function of the detected boundaries. Accordingly, an operator can select desired portions of an existing scene and automatically obtain stored contour outlines of those portions.

Further features and advantages of the invention will become more readily apparent from the following detailed description when taken in conjunction with the accompanying drawings.

BRIEF DESCRIPTION OF THE DRAWINGS

FIG. 3, consisting of FIGS. 3A–3F, illustrates operation of the invention by showing an exemplary scene, tabulations which result therefrom, and the results produced by the invention for particular operator selections.

DESCRIPTION OF THE PREFERRED EMBODIMENT

Figure 1:
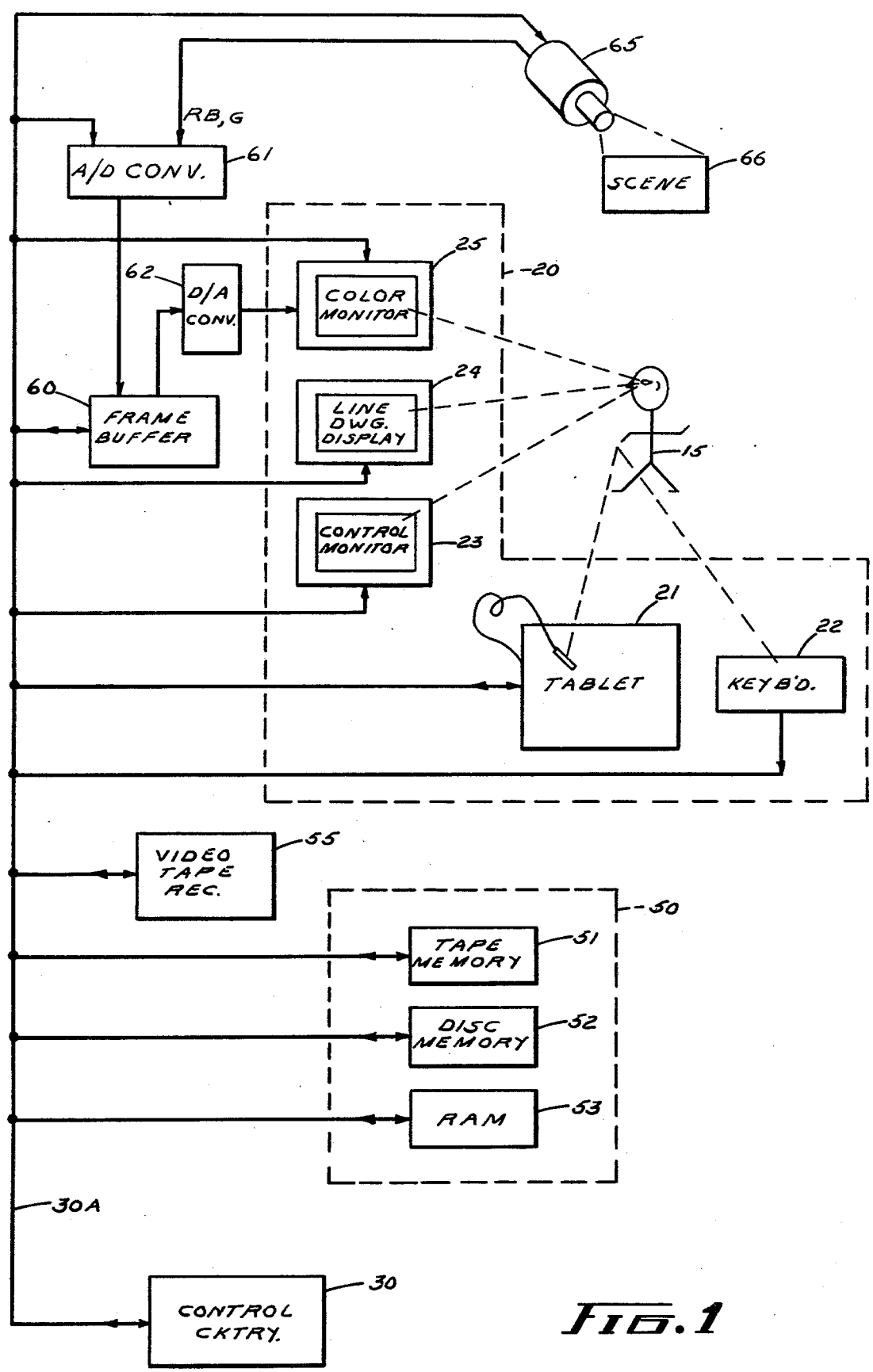
FIG. 1 is a block diagram of an apparatus in accordance with an embodiment of the invention.

Referring to FIG. 1, there is shown a block diagram of an apparatus 10 in accordance with an embodiment of the invention. An operator 15, who is typically, but not necessarily, an animator of some artistic ability, works at a console which includes the devices illustrated within the dashed enclosure 20. In the present embodiment, the console includes two input devices whereby the animator can input information to the apparatus 10, viz. a data tablet 21 and a keyboard 22, and three monitors on which information is displayed, viz. monochrome displays 23 and 24 and color display 25. The data tablet 21 may, for example, be of the type made and sold by Summagraphics Corp. of Fairfield, Conn. which comes equipped with a data pen and operates to generate digital signals that correspond to the instantaneous position of the data pen as it is moved by the operator. The monochrome and color displays may be of the standard cathode ray tube type. The devices in the console 20 are coupled via a bus 30A to control circuitry 30. In the present embodiment the novel functions of control circuitry 30 are implemented by an appropriately programmed general purpose digital computer, for example the model PDP-11 manufactured by Digital Equipment Corp. of Maynard, massachusetts. However, it will be understood that alternate means, such as a special purpose computer or other suitable circuitry having logic and storage capabilities could be utilized to achieve the desired functions. In conjunction with the general purpose digital computer 30 there is provided a data base 50 which includes bulk storage such as magnetic tape memory 51, fast access storage such as disk memory 52, and random access storage such as RAM 53. Typically, at least a portion of the random access memory will be included within the general purpose computer 30, and it will be understood that the amount of each storage medium can be selected by one skilled in the art in accordance with considerations of desired processing times and cost.

A frame storage means 60 is provided and is coupled to the control circuitry 30 and also, via a D/A converter 62, to the color monitor 25. In the present embodiment, the frame storage means is of the digital type, for example the type known as a "frame buffer" manufactured and sold by Evans and Sutherland Company of Salt Lake City, Utah. Essentially, the frame buffer 60 is an addressable memory which stores a frame of video information. Each elemental area (also referred to herein as a point or "pixel") in the video frame has a stored value (referred to as a "pixel value" or "video content value") associated with it, the stored pixel value being an eight bit "word" which has a magnitude representative of the video content of the particular point. Given eight bits, there are 256 possible pixel values associated with each pixel in the frame, and this is sufficient to represent a wide range of color and brightness values, collectively referred to herein as "video content". In the present embodiment, the eight bit binary word "00000000", i.e. 0 in decimal notation, represents black level. The eight bit binary word "11111111", i.e. the number 255 in decimal notation, represents white level. In a monochrome system, the intermediate 254 pixel value possibilities could represent shadings or graduations of gray level, whereas in a color system these remaining levels represent various color possibilities. Any suitable encoding technique can be employed, a typical technique utilizing three of the bits to represent the contribution from one primary component, three of the bits to represent the contribution of another primary component, and the remaining two bits to represent the contribution of a third primary color component, the primary components being, for example, the commonly employed R, B and G color television representations of red, blud and green, respectively. The frame buffer 60 is coupled to the color monitor 25 via a D/A converter 62 which converts each digital pixel value to the appropriate R, B and G analog values for presentation on the color monitor 25. As noted, the frame buffer 60 is coupled to the control circuitry 30 via the bus 30A so that the control circuitry 30A can be utilized to address any desired pixel in the frame buffer, for example to interrogate or read the pixel value contained therein or to write in a new eight bit pixel value at any point. A video tape recording machine 55 is coupled to each of the control circuitry 30, The frame buffer 60 (via A/D converter 61), and the color monitor 25. A color television camera 65, which views an existing scene 66 (for example, a hand drawn sketch or a colored picture), is coupled to the frame buffer 60 via A/D converter 61 and is under control of the circuitry 30. It will be understood that with this arrangement a frame of video information can be read into the frame buffer 60 from the video tape machine 55 or the color camera 65, and the contents of the frame buffer can be displayed on the color monitor 25 or read onto the video tape machine 55 for storage therein. For example, if it is desired to display the contents of the frame buffer 60 on the color monitor 25, the control circuitry 30 is caused to interrogate the frame buffer 60 in a raster scan pattern and the information therein is read out in a sequence which effects display on the color monitor 25 in a manner of conventional color television display. The same is true when it is desired to transfer a frame of video information from the frame buffer to the video tape machine 55, although this capability is not required for the present invention. A new frame of video information can similarly be read into the frame buffer 60, from either the video tape machine 55 or the color camera 65. An additional possibility is where operator-selected pixel values are read into (or out of) the frame buffer 60 directly by the control circuitry 30. This operation can be performed by interrogating a desired pixel in the frame buffer and either reading out the pixel value contained at such pixel or reading a new pixel value into the pixel. In the present embodiment the operator 15 controls operation of the circuitry 30 via the data tablet 21 and the keyboard 22. As noted, the data tablet is conventionally provided with a data pen. This data pen includes a switch in its tip, the switch being activated when the tip is depressed, such as during writing on the tablet. When the switch is on, the coordinates at which the pen tip is located are input to the control circuitry 30. The data pen is primarily utilized in the present embodiment to input commands to the control circuitry 30 by utilizing the data pen and tablet in conjunction with the monitor 23. In particular, when a decision is to be made by the operator/animator 15, a "menu" of possible command decisions will appear on the control monitor 23. The control monitor 23 is also adapted to display a cursor dot whose position depends on the instantaneous position of the data pen on the tablet. Accordingly, when a menu is presented on the display screen 23, the operator can select a desired command word from the menu by positioning the data pen such that the cursor dot moves to a position over the desired word, and then activating the switch of the pen by depressing the pen point. It will be understood, however, that alternate means of inputting operator commands into the control circuitry 30, for example by using a light pen or other conventional means, can be utilized, or commands can be input strictly from the keyboard, if desired. The described techniques for inputting commands to a computer are all well known in the art and commercially available, and the description as set forth is intended to facilitate understanding for those not familiar with available data tablet control systems.

Figure 2:
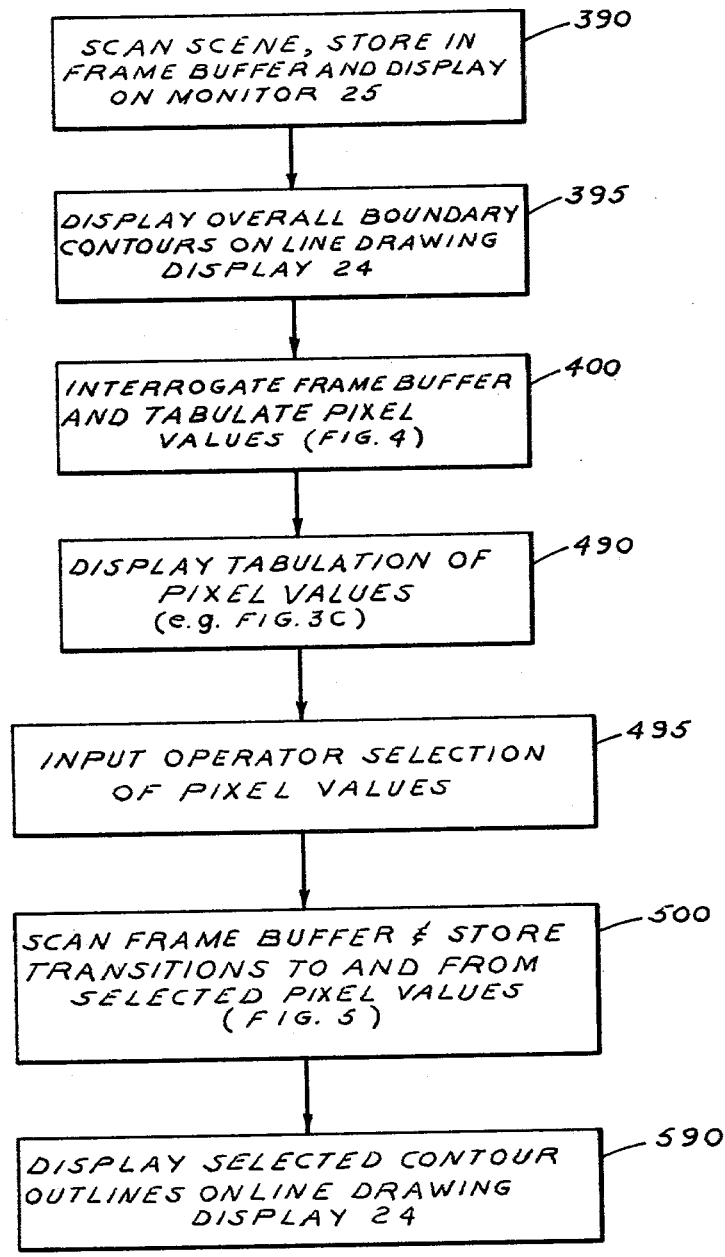
FIG. 2 is a flow diagram which, when taken in conjunction with the flow diagrams which depend therefrom, illustrates the implementation of a general purpose computer to perform functions of the control circuitry of FIG. 1 as defined by the invention.

Referring to FIG. 2, there is shown a flow diagram which, when taken in conjunction with the flow diagrams of FIGS. which depend therefrom, is suitable for implementing a general purpose computer to perform the functions of the control circuitry 30 as defined by the invention. In accordance with an embodiment of the invention, the outline of operator-selected portions of an existing scene are extracted and stored in the data base 50. In an example to be described, an existing colored scene is scanned by the color television camera 65 and the outlines obtained by the invention are displayed on the line drawing display 24. It will be understood, however, that the existing scene could be read in from an alternate source, such as the video tape recorder 55, and the obtained outlines could be stored and displayed in any desired manner. The scene viewed by the color camera 65 is read into the frame buffer 60 via the A/D converter 61, as represented by the block 390, and displayed on color monitor 25 (see e.g. the scene of FIG. 3A). Accordingly, each pixel location in the frame buffer 60 contains an eight bit word which represents one of 256 possible (decimal) representations of video content value, i.e. color or shading. The overall boundary-defining outlines of the scene are then displayed on the line drawing monitor 24, as represented by the block 395 (see e.g. FIG. 3B). The frame buffer 60 is next interrogated by the control circuitry 30, and a tabulation is made of the pixel values stored in the frame buffer. This function is represented by the block 400 of FIG. 2, and described in further detail in conjunction with FIG. 4. Briefly, the interrogation of the frame buffer is achieved by interrogating each pixel location and summing the total number of pixel elements having a particular pixel value. Accordingly, the final tabulation in the present embodiment consists of 256 sums. For many typical scenes wherein only a few colors are present, most of the sums will be zero. The tabulation is displayed on the monitor 23, as represented by the block 490 of FIG. 2 (see e.g. the tabulation of FIG. 3C).

The animator next selects the particular ones of the pixel values that are contained in the scene areas of interest (block 495). For example, assume that a particular character in an existing scene is made up entirely of four colors, the scene background containing other colors. In such case, if the operator desires to "extract" the contour outlines of the character in question for use in animation being generated, the animator selects the four constituent colors which are input to the control circuitry 30. The selection of pixel values by the operator can also be specified in a "negative" sense, such as by specifying the selection of all pixel values except a given group of one or more pixel values, as may be convenient when it is desired to utilize all contours of the existing scene or to exclude only certain particular background areas.

After the desired pixel values have been selected by the operator, the frame buffer is scanned and all transitions to and from the selected pixel values are stored, the functions of this operation being represented by the block 500 of FIG. 2 and described further hereinbelow in conjunction with FIG. 5. This technique yields the locations of all points defining the boundaries of the operator-selected colors. The resultant contour outline, which can now be displayed on the line drawing display 24 (as represented by block 590 of FIG. 2) is most useful for subsequent generation of animation, for example by utilizing techniques set forth in the above-referenced copending U.S. application Ser. No. 752,114.

FIG. 3A illustrates an example of a colored scene which may be viewed by the color television camera 65 and stored in the frame buffer 50. A "bug" 301 made up of four different colors is utilized for purposes of illustration. The bug has a body 302 of a first color ($C_1$), a head 303 of a second color ($C_2$), lower wings 304 and 305 of a third color ($C_3$), and upper wings 306 and 307 of a fourth color ($C_4$). FIG. 3B represents the overall boundary or contour outline of the bug 301 which is displayed on the line drawing display 24 when the contents of the frame buffer 60 are first interrogated (block 490), as will be described in further detail hereinbelow. Briefly, this is achieved by detecting and storing transition points in the frame buffer at locations corresponding to frame buffer locations where a change in pixel value is detected during a scan. FIGS. 3C and 3E each show a tabulation of the colors present in the scene of FIG. 3A. The technique of obtaining the tabulation is set forth in detail hereinbelow in conjunction with FIG. 4. The tabulations of FIGS. 3C and 3E are in the form of a simple bar graph with one bar for each color (or pixel value—an eight bit word designated "C") found present in the frame buffer, and the height of each bar (designated "S(C)") representing the total number of pixels which have the particular color assigned to the bar. The total number of pixel values, S(C), for a given color, C, corresponds to the total cumulative area of that color in the scene. The color for each bar of the graphs of FIG. 3C and FIG. 3E can be identified either by labeling the abscissa locations or by presenting the tabulations on a color monitor (not shown—although this could readily be done by having the control monitor 23 be a color monitor), with each bar being displayed in the actual color it represents.

It is thus seen that the tabulations of FIGS. 3C and 3E in the present embodiment correspond to the color component content of the scene. In particular, the bar representing the fourth color $C_4$ (the color of areas 306 and 307) has the greatest value and the bar representing the first color $C_1$ (area 302) has the next greatest value. The relatively small total area of the third color $C_3$ (areas 304 and 305) is represented by the next largest bar and the smallest total area of the second color $C_2$ (area 303) has a correspondingly small bar in the tabulations of FIGS. 3C and 3E. It should be noted that the particular abscissa positions of the bars can be in any desired order. Also, the tabulation could alternately be displayed numerically or printed out, by printing the total number of pixels for each pixel value in the scene. There are many additional alternate ways in which the tabulation, once obtained, can be displayed.

Assume that the operator selects the first and third colors (contained within areas 302 and 304, 305) as those which are contained within contour outlines that he wishes to utilize. This situation is represented in FIG. 3C by the dots above the bars $C_1$ and $C_3$. When the animator has selected these colors, a subsequent scan of the frame buffer (as described in conjunction with FIG. 5) results in the storage of coordinate points that correspond to pixels in the frame buffer at which there is a transition to or from the selected colors. For the example of FIG. 3C, this would result in the contour outline shown in FIG. 3D. Accordingly, the coordinate points of the outline shown in the FIG. 3D are stored in the data base 50 for use in generating subsequent animation (block 500). The resultant contour outline can be displayed on the line drawing display 24, as represented by block 590 of FIG. 2. Another example is set forth in the tabulation of FIG. 3E wherein the operator selects the first color (area 302), the second color (area 303) and the fourth color (areas 306 and 307), as indicated in FIG. 3E by the dots over the bars corresponding to $C_1$, $C_2$ and $C_4$. In this case, the resultant contour outline, whose coordinate points will be stored in the data base 50, is shown in FIG. 3F. It is seen that the operator can select any color or colors of an existing scene and obtain a stored representation, for use in generating subsequent animation, of a contour outline which defines the boundaries of the selected colors. It should be noted that for ease of illustration in FIGS. 3A-3F, the color of the background was omitted from the tabulation, although it will typically be present and can be selected by the operator, if desired.

Figure 4:
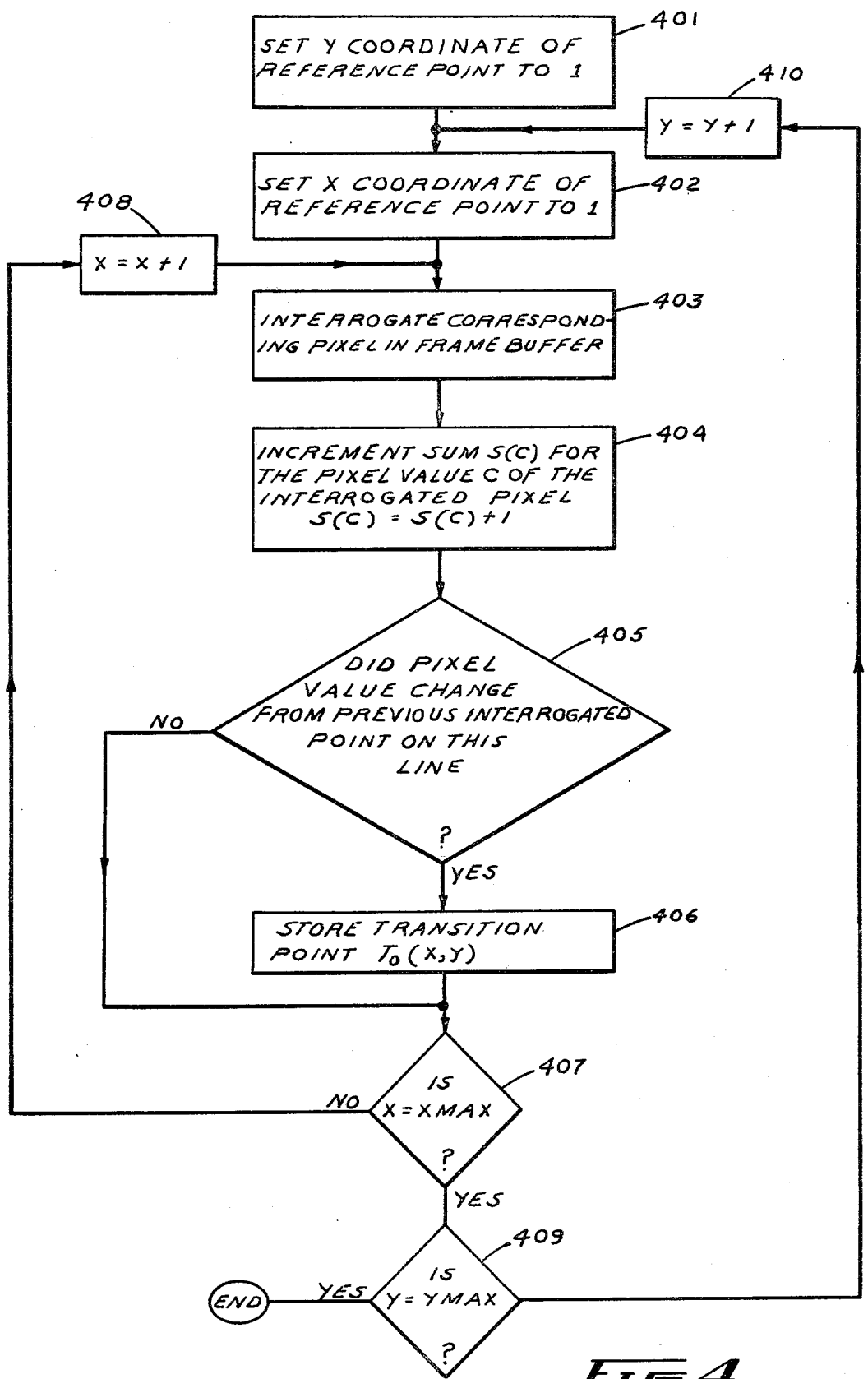
FIG. 4 is a flow diagram suitable for implementing the interrogation of frame buffer and tabulation functions represented by the block 400 of FIG. 2.

Referring to FIG. 4, there is shown a flow diagram suitable for programming the control circuitry 30 to implement the routine of interrogating the frame buffer and tabulating the pixel values, as represented by the block 400 of FIG. 2. The y coordinate value of the pixel or point in the frame buffer to be interrogated, designated as a "reference point", is initially set to 1, as represented by block 401. The x coordinate of the reference point is also initially set to 1 (block 402). The pixel (x,y) is then interrogated, and the value of the eight bit word at the particular pixel, i.e. a pixel value designated C, is read out from the frame buffer to the control circuitry 30. This function is represented by the block 403 of FIG. 4. The running sum S(C) for the particular pixel value C found at the coordinate point (x,y) is increased by 1, as represented by the block 404. Inquiry is then made as to whether the pixel value changed from the last interrogated point on this line (diamond 405) i.e. whether C for the point (x,y) has the same value as the pixel value C had at the coordinate point (x−1,y). If the pixel value did change from the last point on this line, a transition is evident and the transition point, called $T_0(x,y)$, is stored. This function is represented by the block 406. The output of the block 406, as well as the "no" branch output of diamond 405 (indicative of no transition) is input to the diamond 407 for determination of whether x is at the maximum possible coordinate, designated XMAX. If not, x is incremented (block 408) and the block 403 is reentered. When the last x value has been reached, indicating the end of a scanline, the diamond 409 is entered to determine whether the y coordinate has reached its maximum value, designated YMAX. If not, y is incremented (block 410) and the block 402 is reentered to cycle through the next line of x coordinates. When the maximum y value has been reached, the routine is over. The stored points $T_0(x,y)$ are the transition points which define the overall boundary outline of the scene which can be displayed (e.g. FIG. 3B—block 395 of FIG. 2). The initializing of the sums S(C) at zero and the clearing of previously stored transition points can be implemented prior to entering the routine.

Figure 6:
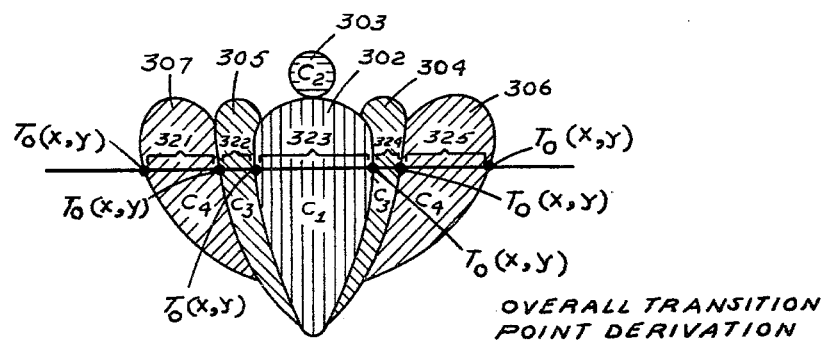
FIG. 6 shows the exemplary scene of FIG. 3 and is useful in understanding operation of the flow diagram of FIG. 4.

FIG. 6 further illustrates the operation of the flow diagram of FIG. 4, using as an example a horizontal scanline which is scanned while interrogating the frame buffer for one pass of x coordinate values. Each time the interrogated pixel value changes from its previous value along the scanline, a transition point is stored as $T_0(x,y)$ where (x,y) are the coordinates of the transition point. It will be recalled that this operation is described in conjunction with the block 406 of FIG. 4. In FIG. 6, the transition points which result from a scanline through the "bug" of FIG. 3A are shown as prominent dots. For example, the leftmost transition point will occur when a change is sensed from the background color level to the fourth color, $C_4$, and this results in a transition point being stored as $T_0(x,y)$. The remainder of the transition points along the scanline are sensed and stored in similar manner. The rightmost transition point occurs due to a change to the background color.

The illustrated brackets 321-325 represent the number of pixels between transition points. It will be understood from the foregoing (e.g. block 404 of FIG. 4), that the number of points traversed in each color area are added to the particular sum, S(C), for the particular color C. Thus, for example, during the illustrated scanline the sum for the fourth color, $S(C)_4$, will be incremented by an amount which equals the total number of pixels included in the brackets 321 and 325, whereas the sum $S(C)_3$ will be incremented by an amount which equals the total number of pixels or points included in the brackets 322 and 324, etc. Accordingly, after a full interrogation of all lines in the frame buffer, the final sum, S(C), for each color will represent the total area for the particular color, C.

Referring again momentarily to FIG. 2, it is seen that the display of the overall boundary contours (as represented by block 395) is effected by presenting all stored transition points on the line drawing display 24, as illustrated in FIG. 3B.

Figure 5:
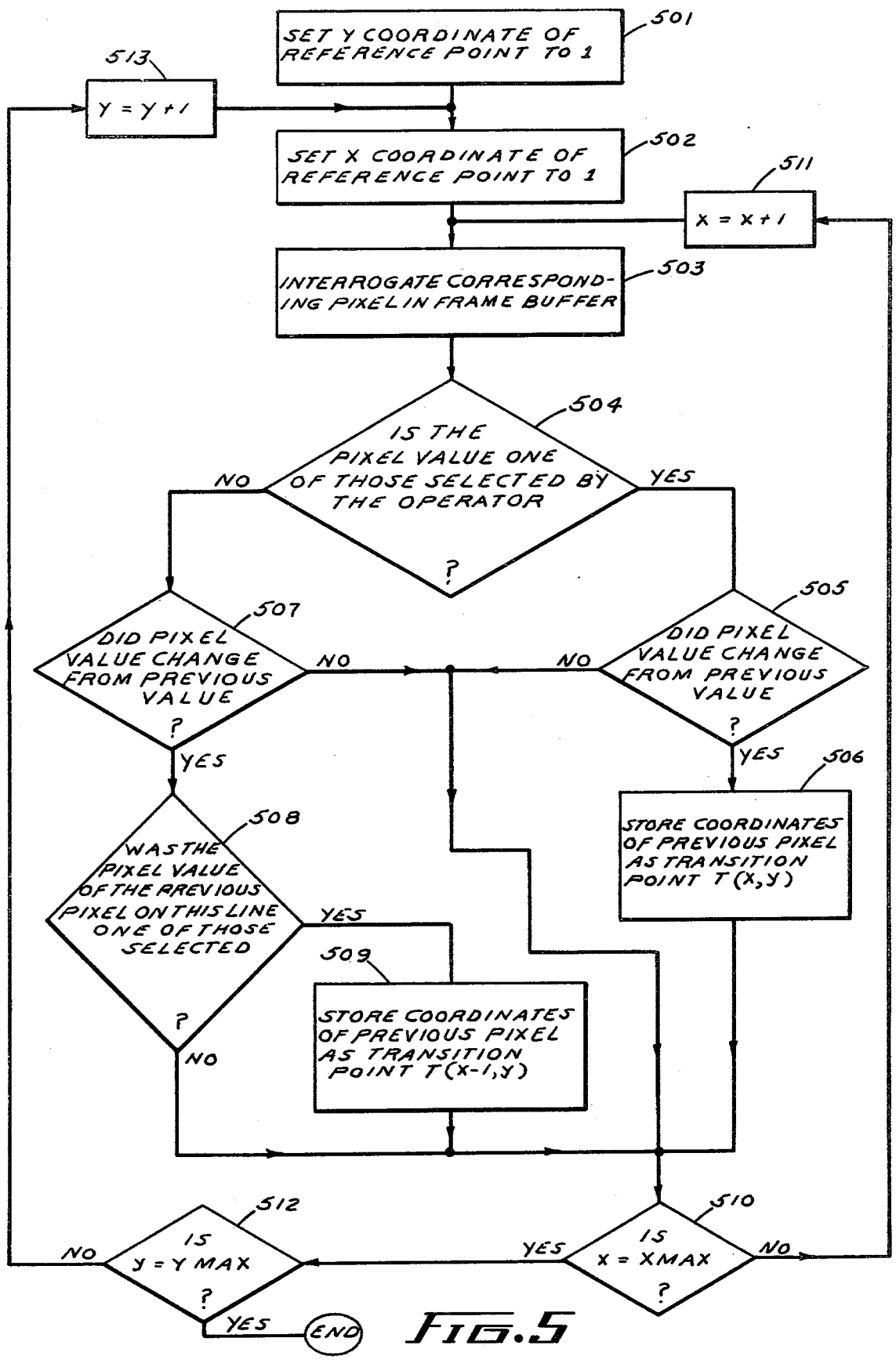
FIG. 5 is a flow diagram suitable for implementing the scanning of the frame buffer and storage of transition points, as represented by the block 500 of FIG. 2.

Referring to FIG. 5, there is shown a flow diagram suitable for programming the control circuitry 30 to implement the routine of scanning the frame buffer and storing transitions found to occur to and from the operator-selected pixel values (colors, in this case), as represented by the block 500 of FIG. 2. The y coordinate of a reference point (similar to the usage thereof in FIG. 4) is initially set to 1, as represented by the block 501. The x coordinate of the reference point is also initially set to 1 (block 502). The pixel (x,y) is then interrogated (block 503), and inquiry is made as to whether the pixel value at the particular pixel is one of those selected by the operator (diamond 504). If it is not, diamond 507 is entered and inquiry is made as to whether the pixel value changed from the previous pixel value on the line being scanned. If not, diamond 510 is entered to test whether the scanline is completed (as was described in conjunction with FIG. 4). If the pixel value has changed, however, a transition is indicated and inquiry is now made (diamond 508) to determine whether or not the transition is of interest; i.e., whether it is a transition to one of the pixel values selected by the operator. If so, the answer to the inquiry of diamond 508 will be in the affirmative and block 309 is entered, this block directing storage of the coordinates of the previous pixel, (x−1,y) as a transition point designated T(x−1,y). Since the previous point was the last point on the line which fell within an area having an operator-selected color, it is that point which is stored as the transition (or boundary) point. If the answer to the inquiry of diamond 508 is negative, no transition from an operator-selected color is evident and the diamond 510 is entered for testing as to whether the scanline is complete. Accordingly, the diamonds 507, 508 and the block 509 handle the situation wherein there is a transition from one of the operator-selected pixel values (diamond 508 positive) to the present pixel value which is not one of those selected by the operator (diamond 504 negative).

Consider now the situation when the answer to the inquiry of diamond 504 is in the affirmative; i.e., the pixel value of the present pixel is one of those selected by the operator. In this case, the answer to the inquiry of diamond 504 is in the affirmative and diamond 505 is entered whereupon inquiry is made as to whether the present pixel value is different than the pixel value at the previous pixel. If so, the coordinates of the present pixel are stored as transition point T(x,y), as represented by the block 506. The output of the block 506, as well as the "no" branch of diamond 505, is coupled to the diamond 510 wherein the x value of the reference point is tested to see if the end of a scanline has been reached. If not, x is incremented (block 511) and the block 503 is reentered for processing of the next reference point on the scanline. However, if x equals XMAX, the diamond 512 is entered to determine whether the y coordinate of the reference point is t its maximum value, YMAX, which would indicate that the last scanline has been processed. Accordingly, a "yes" answer to the inquiry of diamond 512 signifies an end of the routine of FIG. 5 whereas a "no" answer causes entry of the block 513 wherein y is incremented. The block 502 is then reentered to reset the x coordinate for the next line to 1, and processing continues. It is thus seen that the two separate branches from the diamond 504 handle the situations of both a change "from" a pixel value selected by the operator (diamonds 507 and 508, leading to block 509) and a change "to" a pixel value selected by the operator (diamond 505 leading to block 506).

Figure 7:
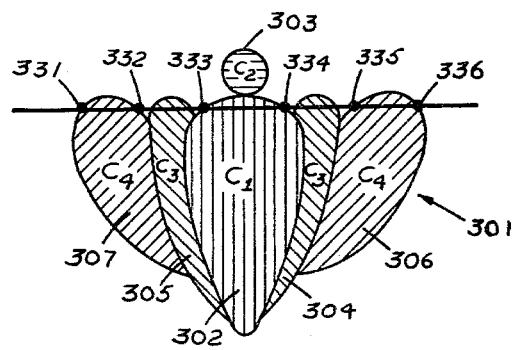
FIG. 7 shows the exemplary scene of FIG. 3 and is useful in understanding operation of the flow diagram of FIG. 5.

Operation of FIG. 5 is illustrated by an example of FIG. 7 which shows the "bug" 301 and assumes that the operator has selected the pixel values (colors in this case) indicated by the dots in the tabulation of FIG. 3E; viz., the colors $C_1$, $C_2$, and $C_4$. The scanline shown in FIG. 7 illustrates the transition points that would result from this particular operator selection. Specifically, the point 331 would be stored as a transition point since a transition is sensed from a pixel value not selected by the operator to one which is selected by the operator, by virtue of diamonds 504 and 505, and the block 506. The point 332 would be stored as a transition point since it is at a transition from a pixel value selected by the operator to a pixel value not selected by the operator, the transition point storage occurring by virtue of operation of diamonds 504, 507 and 508, and the block 509. In similar manner, the transition points designated in FIG. 7 as 333,334, 335 and 336 would also be stored. Note that the transitions to and from the color $C_3$ do not result in stored transition points since, for this example, $C_3$ is not one of the colors selected by the operator. It is thus readily seen from the example of FIG. 7 that the boundary contour outline defined by transition points from a full scan of the "bug" 301 would result in the contour outline shown in FIG. 3F, which is the desired result.

I claim:

1. Apparatus for generating video-representative signals which represent one or more operator-selected portions of a scene, comprising:
   frame storage means for storing an array of elemental pixel values representative of the video content of the individual elemental areas in said scene;
   means for interrogating said frame storage means and for tabulating the pixel values stored in said frame storage means;
   operator controllable means for selecting one or more of the pixel values of said tabulation; and
   means responsive to said selected values for forming video-representative signals corresponding to those portions of the scene having the selected pixel values.

2. Apparatus as defined by claim 1 further comprising means for displaying the tabulation of pixel values.

3. Apparatus as defined by claim 1 wherein said means for interrogating said frame storage means includes means for detecting all boundaries in the scene stored in said frame storage means and for storing the overall contour outline of said scene.

4. Apparatus as defined in claim 1 further comprising display means for displaying said video-representative signals.

5. Apparatus as defined by claim 1 wherein said means for forming video-representative signals comprises means for detecting the boundaries of those portions of the scene having the selected pixel values and for storing outline-representative transition points as a function of the detected boundaries.

6. Apparatus as defined by claim 5 wherein said means for interrogating said frame storage means includes means for detecting all boundaries in the scene stored in said frame storage means and for storing the overall contour outline of said scene.

7. Apparatus as defined by claim 5 further comprising display mens for displaying said video-representative signals.

8. Apparatus for generating video-representative signals which represent one or more operator-selected portions of a scene, comprising:

frame storage means for storing an array of elemental pixel values representative of the video content of the individual elemental areas in said scene;

operator-controllable means for selecting one or more pixel values;

means for interrogating the frame storage means and for detecting boundaries of those portions of the scene having the operator-selected pixel values; and means for storing outline-representative transition points as a function of the detected boundaries.

9. Apparatus as defined by claim 8 further comprising means for displaying the stored outline-representative transition points.

10. A method for generating video-representative signals which represent one or more operator-selected portions of a scene, comprising the steps of:

(a) storing an array of elemental pixel values representative of the video content of the elemental areas in said scene;

(b) interrogating the stored array and tabulating the stored pixel values;

(c) selecting one or more of the pixel values of the tabulation; and (d) forming video-representative signals corresponding to those portions of the scene having the selected pixel values.

11. The method as defined by claim 10 further comprising the step of displaying the tabulation of pixel values.

12. The method as defined by claim 10 wherein the step of forming video-representative signals comprises detecting the boundaries of those portions of the scene having the selected pixel values and storing outline-representative transition points as a function of the detected boundaries.

13. The method as defined by claim 10 wherein the step of interrogating the stored pixel values comprises detecting all boundaries in the scene and storing the overall contour outline of the scene.

14. A method for generating video-representative signals which represent one or more operator-selected portions of a scene, comprising the steps of:

(a) storing an array of elemental pixel values representative of the video content of the individual elemental areas in the scene;

(b) selecting one or more pixel values;

(c) interrogating the stored pixel values and detecting boundaries of those portions of the scene having the selected pixel values; and (d) storing outline-representative transition points as a function of the detected boundaries.

15. The method as defined by claim 14 further comprising the step of displaying the stored outline-representative transition points.

* * * * *